United States Patent
Wei et al.

(10) Patent No.: US 11,259,270 B2
(45) Date of Patent: Feb. 22, 2022

(54) WIRELESS COMMUNICATIONS SYSTEM, INFRASTRUCTURE EQUIPMENT, COMMUNICATIONS DEVICE AND METHODS

(71) Applicant: Sony Corporation, Tokyo (JP)

(72) Inventors: Yuxin Wei, Basingstoke (GB); Vivek Sharma, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/960,582

(22) PCT Filed: Jan. 3, 2019

(86) PCT No.: PCT/EP2019/050120
§ 371 (c)(1),
(2) Date: Jul. 8, 2020

(87) PCT Pub. No.: WO2019/137849
PCT Pub. Date: Jul. 18, 2019

(65) Prior Publication Data
US 2020/0396715 A1 Dec. 17, 2020

(30) Foreign Application Priority Data
Jan. 11, 2018 (EP) .................................. 18151297

(51) Int. Cl.
*H04W 68/04* (2009.01)
*H04W 76/27* (2018.01)
(Continued)

(52) U.S. Cl.
CPC ........... *H04W 68/04* (2013.01); *H04W 48/12* (2013.01); *H04W 68/005* (2013.01); *H04W 68/02* (2013.01); *H04W 76/27* (2018.02)

(58) Field of Classification Search
CPC ..... H04W 68/04; H04W 76/27; H04W 48/12; H04W 68/005; H04W 68/02; H04W 60/00; H04W 64/006; H04W 4/029; Y02D 30/70
See application file for complete search history.

(56) References Cited

U.S. PATENT DOCUMENTS

2015/0289110 A1  10/2015  Kilpatrick, II et al.
2019/0319868 A1*  10/2019  Svennebring .......... H04L 41/147

FOREIGN PATENT DOCUMENTS

EP  2129141 A1  12/2009

OTHER PUBLICATIONS

International Search Report and Written Opinion dated Mar. 6, 2019 for PCT/EP2019/050120 filed on Jan. 3, 2019, 13 pages.
(Continued)

*Primary Examiner* — Diane D Mizrahi
(74) *Attorney, Agent, or Firm* — Xsensus, LLP (57) ABSTRACT

A wireless communications system includes a plurality of infrastructure equipment forming part of a radio access network of a wireless communications network, and a communications device configured to transmit signals via the wireless access interface to one or more of the infrastructure equipment and to receive signals transmitted from one or more of the infrastructure equipment via the wireless access interface. The communications device is configured, when in an inactive state, to receive, from one of the infrastructure equipment, information from which an indication of one or more of the infrastructure equipment representing a notification area of the radio access network can be derived, the one or more infrastructure equipment of the notification area being for use in transmitting tether signals to the communications device from the wireless communications network.

16 Claims, 4 Drawing Sheets

(51) Int. Cl.
*H04W 48/12* (2009.01)
*H04W 68/00* (2009.01)
*H04W 68/02* (2009.01)

(56) References Cited

OTHER PUBLICATIONS

3GPP, "5G; NR; Overall description; Stage-2," 3GPP TS 38.300 version 15.3.1, Release 15, ETSI TS 138 300 V15.3.1, Oct. 2018, pp. 1-89.

3GPP, "5G;System Architecture for the 5G System," 3GPP TS 23.501 version 15.2.0, Release 15, ETSI TS 123 501 V15.2.0, Jun. 2018, pp. 1-218.

Ericsson, et al., "RRC Inactive state—new procedures in TS 23.502," SA WG2 Meeting No. 124, S2-178561 (revision of S2-178xxx), Reno, USA, Nov. 27-Dec. 1, 2017, pp. 1-7.

Huawei, et al., "Identification of air-borne drones," 3GPP TSG-RAN WG2 Meeting No. 98, R2-1705000, Hangzhou, China, May 15-19, 2017, 3 pages.

Samsung, "RAN notification area definition," 3GPP TSG-RAN WG2 Meeting NR Ad-hoc, R2-1700008, Spokane, USA, Jan. 17-19, 2017, 14 pages.

Holma, et al., "System Architecture Based on 3GPP SAE," LTE for UMTS OFDMA and SC-FDMA based radio access, John Wiley & Sons, Ltd., 2009, pp. 25-27.

\* cited by examiner

WIRELESS COMMUNICATIONS SYSTEM, INFRASTRUCTURE EQUIPMENT, COMMUNICATIONS DEVICE AND METHODS

CROSS-REFERENCE TO RELATED APPLICATIONS

The present application is based on PCT filing PCT/EP2019/050120, filed Jan. 3, 2019, which claims priority to EP 18151297.1, filed Jan. 11, 2018, the entire contents of each are incorporated herein by reference.

BACKGROUND

Field of Disclosure

The present disclosure relates to wireless communications systems, and infrastructure equipment and communications devices of such wireless communications systems, in which said communications devices are Unmanned Aerial Vehicles (UAVs) following known flight path plans.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems, as well as future iterations/releases of existing systems, to efficiently support connectivity for a wide range of devices associated with different applications and different characteristic data traffic profiles.

Unmanned Aerial Vehicles (UAV), which are more commonly referred to as "Drones", are expected to be one of the driving forces generating plenty of new services in the market. Since some sort of remote control using a cellular network could be mandated in at least a regulatory manner, the support of cellular communication for UAVs could be foreseen.

SUMMARY OF THE DISCLOSURE

The present disclosure can help address or mitigate at least some of the issues discussed above.

Embodiments of the present technique can provide a wireless communications system including a plurality of infrastructure equipment forming part of a radio access network of a wireless communications network, and a communications device. The communications device is configured, when in an inactive state, to receive, from one of the infrastructure equipment, information from which an indication of one or more of the infrastructure equipment representing a notification area of the radio access network can be derived, the one or more infrastructure equipment of the notification area being for use in transmitting tether signals to the communications device from the wireless communications network. The one or more infrastructure equipment of the notification area are identified by the wireless communications network from a pre-planned journey to be made by the communications device for transmitting the tether signals to the communications device during the journey. Accordingly, the tether signals can be transmitted to the communications device from one or more of the infrastructure equipment based on a location of the communications device along the pre-planned journey thereby making more efficient use of communications resources and energy compared with transmitting the tether signals to all of the infrastructure equipment in the notification area. The tether signals may include for example a paging message, downlink data or a command to the communications device.

In some example applications of embodiments of the present technique, the communications device may form part of an Unmanned Aerial Vehicles (UAV) more colloquially known as a 'drone'. The tether signals transmitted to the communications device from one or more of the infrastructure equipment of the notification area can be for example a command signal to perform a certain action, a message to be stored or a paging message for receiving downlink data from the paging message itself or after transitioning to connected state.

Respective aspects and features of the present disclosure are defined in the appended claims. It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
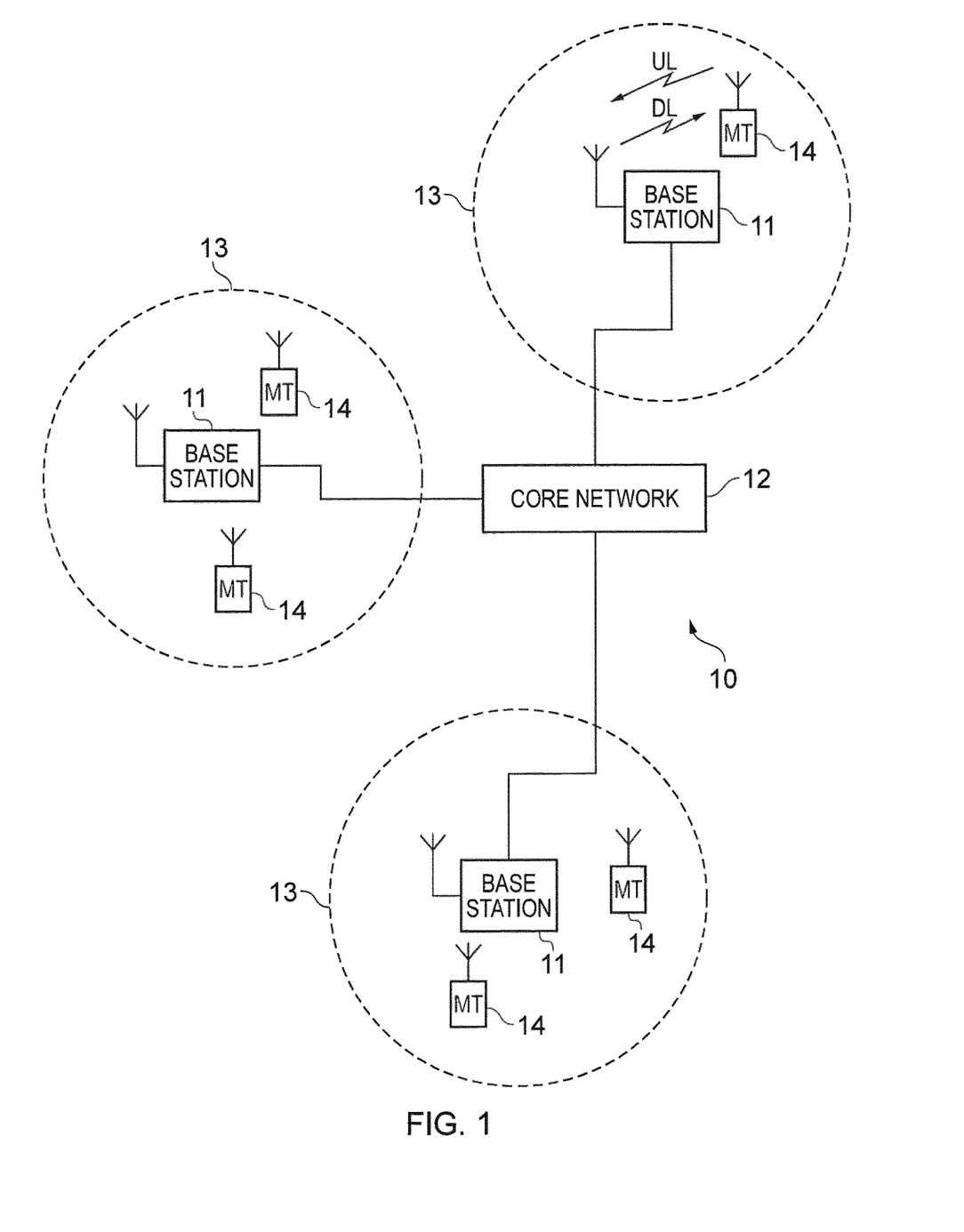
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink. Data is transmitted from terminal devices 14 to the base stations 11 via a radio uplink. The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
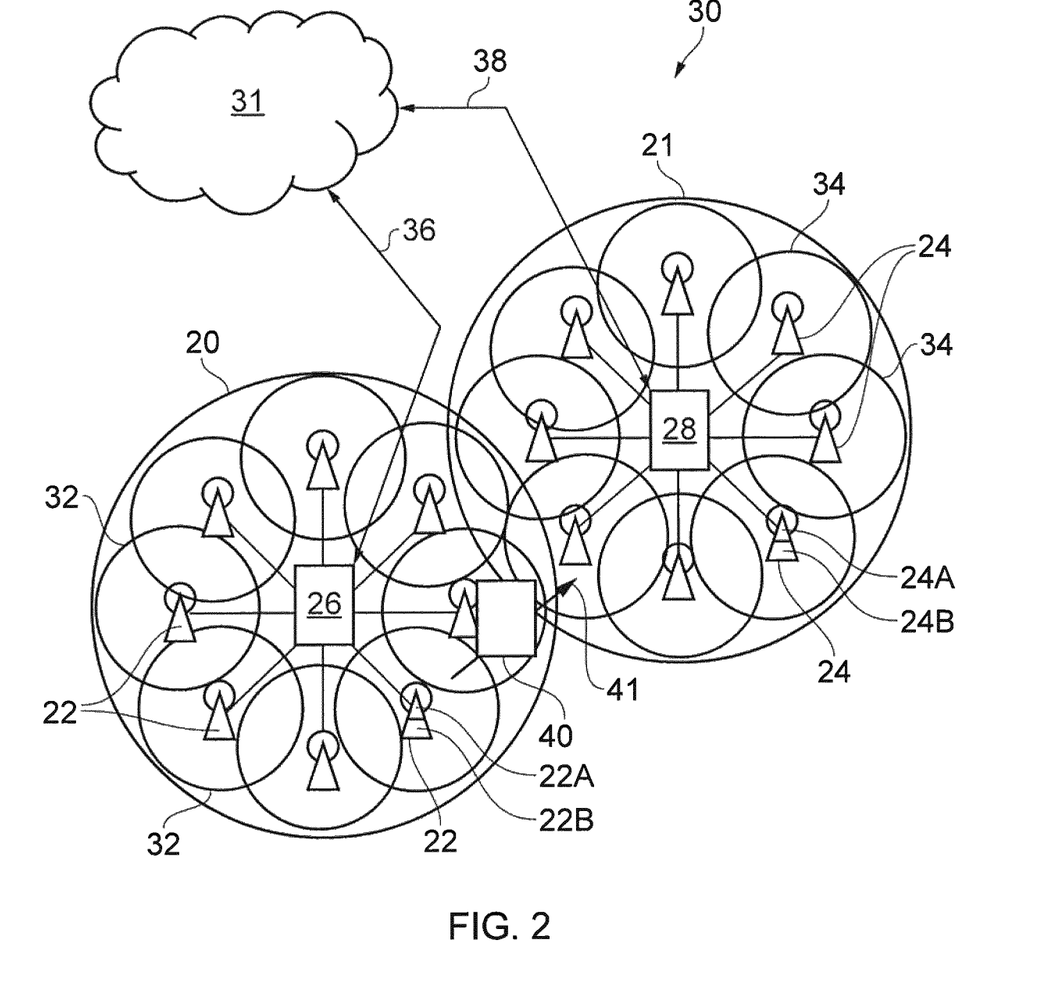
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22a, 22b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating. In such cases, as far as the terminal device is concerned, it simply transmits uplink data to the controlling node 26 and receives downlink data from the controlling node 26 and the terminal device has no awareness of the involvement of the distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

As is well understood, various wireless telecommunications networks, such as the LTE-based network represented in FIG. 1 and the NR-based network represented in FIG. 2, may support different Radio Resource Control (RRC) modes for terminal devices, typically including: (i) RRC idle mode (RRC_IDLE); and (ii) RRC connected mode (RRC CONNECTED). When a terminal device transmits data, RRC connected mode is generally used. The RRC idle mode, on the other hand, is for terminal devices which are registered to the network (EMM-REGISTERED), but not currently in active communication (ECM-IDLE). Thus, generally speaking, in RRC connected mode a terminal device is connected to a radio network access node (e.g. an LTE base station) in the sense of being able to exchange user plane data with the radio network access node. Conversely, in RRC idle mode a terminal device is not connected to a radio network access node in the sense of not being able to communicate user plane data using the radio network access node. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station.

For a terminal device in RRC idle mode the core network is aware that the terminal device is present within the network, but the radio access network (RAN) part (comprising radio network infrastructure equipment such as the base stations 11 of FIG. 1 and/or the combined TRPs/CUs of FIG. 2) is not. The core network is aware of the location of idle mode terminal devices at a paging tracking area level but not at the level of individual transceiver entities. The core network will generally assume a terminal device is located within the tracking area(s) associated with a transceiver entity most recently used for communicating with the terminal device, unless the terminal device has since provided a specific tracking area update (TAU) to the network. (As is conventional, idle mode terminal devices are typically required to send a TAU when they detect they have entered a different tracking area to allow the core network to keep track of their location.) Because the core network tracks terminal devices at a tracking area level, it is generally not possible for the network infrastructure to know which specific transceiver entities (radio network node) to use when seeking to initiate contact with a terminal device in idle mode. Consequently, and as is well known, when a core network is required to connect to an idle mode terminal device a paging procedure is used. More can be learned about the architecture and functions for 5G mobile communications systems in [2].

Unmanned Aerial Vehicles (UAVs)

According to a RAN meeting document on drones [3], a drone may be categorised as one of the three following types:

A drone carrying an illegal UE;
A drone carrying a legal UE, but where the UE is only certified for terrestrial operation (e.g. a smart phone); and
A drone carrying a legal UE which is certified for aerial usage.

In [3], it has been agreed that:
Both command and control and application data of drones using LTE connectivity are within the scope of the study item. The traffic characteristics are for further study; and Potential enhancements for aerial vehicles in RRC idle and connected modes will be considered.

Although the current UAV study is focused on the LTE optimisation, it is foreseen that NR should address UAV UEs as well in the near future. In NR, a new C state, called RRC_INACTIVE state, is introduced. A UE in this state has a stored RRC context, and monitors for signals transmitted by the eNodeB/gNodeB/infrastructure equipment. The UE can move within an area configured by the NR RAN (known as NextGen RAN or NG RAN), which is termed the RAN Notification Area (RNA), without notifying the NG RAN. The last serving gNodeB keeps the UE context and the UE associated NG connection with the serving Access & Mobility Management Function (AMF) and User Plane Function (UPF).

RRC_INACTIVE State and RNA

As described in [4], the RRC_INACTIVE state can be characterised by:

Broadcast of system information;
Cell re-selection mobility;
Paging is initiated by NG-RAN (RAN paging);
RAN-based notification area (RNA) is managed by NG-RAN;
DRX for RAN paging configured by NG-RAN;
5GC-NG-RAN connection (both C/U-planes) is established for UE;
The UE AS context is stored in NG-RAN and the UE; and
NG-RAN knows the RNA which the UE belongs to.

The RNA configured for a UE may cover either a single cell, or multiple cells, and may be smaller than the core network area. An RNA update (RNAU) is transmitted by the UE to the network periodically, and also when the UE's cell reselection procedure selects a cell outside of the configured RNA. Further details on the RRC_INACTIVE state can be found in [4].

UAVs in RRC_INACTIVE State

From the current RRC_INACTIVE state description, we can summarise that:

The RNA is composed of one or several cells. When the UE moves out of coverage of the last serving base station, the last serving base station will send a paging message to all of the cells in the RNA if there downlink data or signalling data for the UE; and
A UE in the RRC_INACTIVE state will be configured with a periodic RNA update timer.

The benefits of UEs in the RRC_INACTIVE state (i.e. power saving and control signalling reduction) can be applied to UAVs as well. The motivation can be seen for UAVs to support RRC_INACTIVE as well. One of the application scenarios that can be foreseen is for the use case of an auto piloted drone, which may for example be used for delivery of packages. After the flight path has been set (e.g. a route to the specified address for the package delivery) and the drone is on the pre-defined route, it may need to receive control commands from time to time. In this case, keeping the drone in the RRC_INACTIVE state is preferable, as this could save control signalling in establishing the RRC connection compared to moving to the RRC_IDLE state. If the direct data transmission is to be supported in the inactive state, the benefits could be even greater, as it is likely that the control commands for the drone may only require a relative small amount of data. Therefore this data can be—received in RRC_INACTIVE state or carried for example in a paging message or conveyed in a paging like procedure or received after being paged while still in RRC_INACTIVE state or received after being paged and moving to RRC_CONNECTED state.

For the scenario in which the flight path plan is known in advance, for example, an auto piloted, package delivery drone, and the speed/direction of the UAV is able to be estimated, there is room to further enhance the performance for UAVs in RRC_INACTIVE state, i.e.:

The RNA is UE specific. For the UAVs with the known flight path plan, the cell list can be set to cover the flight path plan as the RNA. The cell list could be obtained by planned flight path on the coverage map by Minimise drive test (MDT) function. Another example, the cell list could be obtained by the distance (path loss) between the centre of neighbour cells and the planned flight path. The flight path may also be produced from an application server connected to the wireless communications network.

Once the UAVs take off, it can be estimated in which cell the UAVs are in according to the flight path plan, the present time, the time the UAV began its journey, and its speed.

The periodic RAN Notification Area Update timer is for use by the UEs moving in the RNA to change its serving base station accordingly. When the timer is expired, the corresponding RNA update procedure is triggered. It can sometimes shorten the paging delay or downlink data transmission delay if the UE frequently changes its serving base station while in the RNA.

Enhancements for UAVs in RRC_Inactive State with a Known Flight Path Plan

Figure 3:
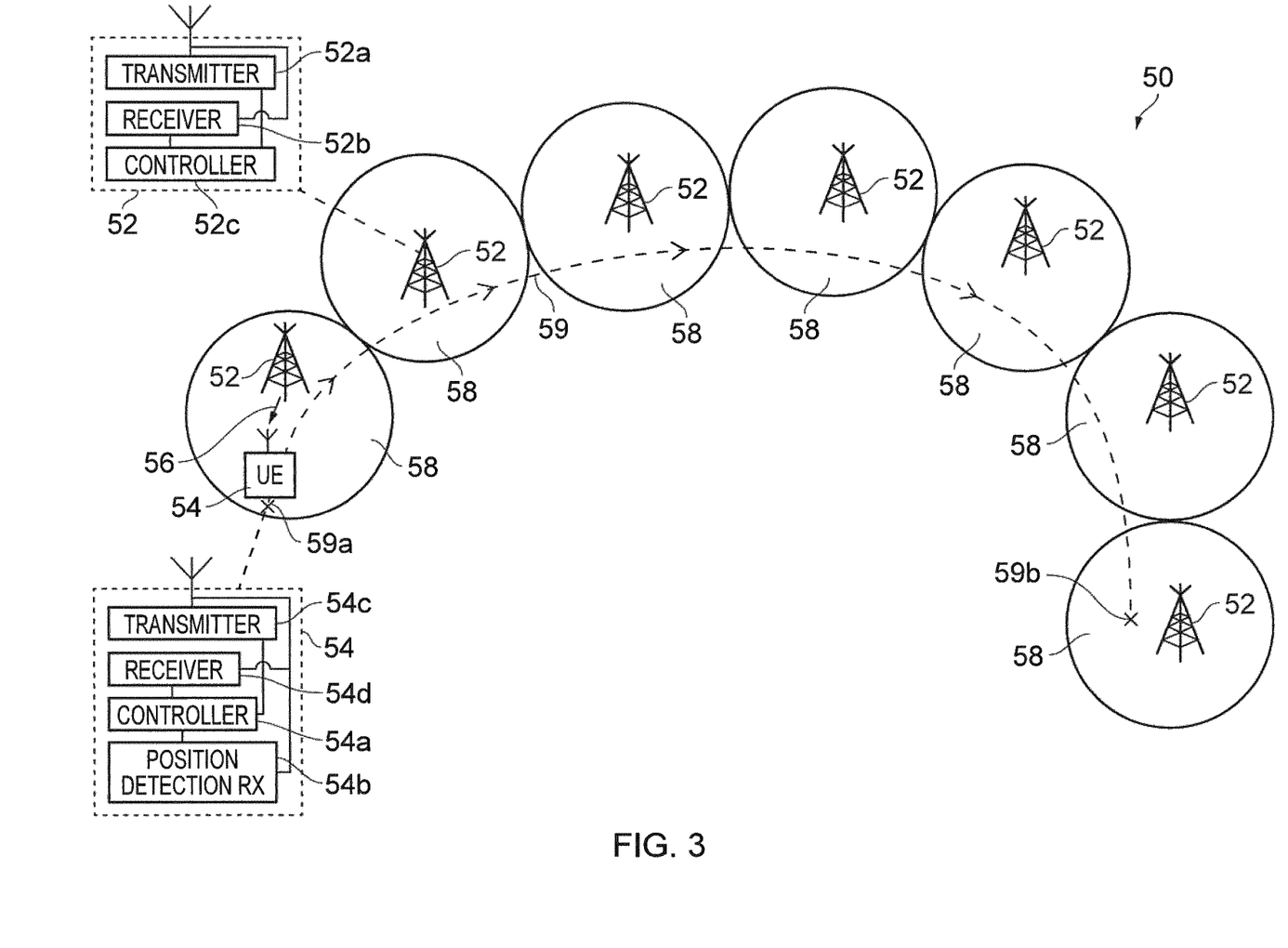
FIG. 3 shows a wireless communications system in accordance with embodiments of the present technique.

FIG. 3 shows a wireless communications system 50 in accordance with embodiments of the present technique. The wireless communications system 50 comprises a plurality of infrastructure equipment 52 forming part of a radio access network of a wireless communications network, each of the plurality of infrastructure equipment 52 including transmitter circuitry 52a for transmitting signals to communications devices 54 via a wireless access interface formed by the infrastructure equipment 52, and receiver circuitry 52b for receiving signals from the communications devices 54 via the wireless access interface, and a communications device 54 configured to transmit signals via the wireless access interface to one or more of the infrastructure equipment 52 and to receive signals transmitted from one or more of the infrastructure equipment 52 via the wireless access interface, the communications device 54 including controller circuitry 54a and a position detection receiver 54b for generating an indication of a location of the communications device 54. The communications device 54 is configured, when in an inactive state, to receive 56, from one of the infrastructure equipment 52, an indication of one or more of the infrastructure equipment 52 representing a notification area 58 of the radio access network, the one or more infrastructure equipment 52 of the notification area 58 being used to transmit a paging message to the communications device 54 for the communications device 54 to receive downlink data from the wireless communications network. The one or more infrastructure equipment 52 of the notification area 58 are identified by the wireless communications network from a pre-planned journey 59 to be made by the communications device 54 from a start location 59a to a destination location 59b.

In other words to those used in relation to FIG. 3, for UAVs in the RRC_INACTIVE state with a known flight path plan, the network will configure a RAN based notification area based on the cells which cover the flight path plan. The network will send the RAN based notification area configurations to the UE in the form of e.g. a list of cells via dedicated signalling or a RAN area ID via broadcast signalling.

The wireless communications system may comprise a mobility function device arranged in communication with the one or more infrastructure equipment and configured to transmit the indication of the one of more infrastructure equipment of the notification area to the communications device.

The network will then in some arrangements be able to send any paging messages to the estimated latest serving base station according to the flight path plan and moving speed of UAV, in combination with the start time of the UAV's journey and the present time. In other words, in these arrangements, the wireless communications network is configured to transmit a paging message to the communications device via one of the infrastructure equipment in the notification area based on an estimated speed of the communications device and a time at which the communications device started the pre-planned journey from the start location.

In some arrangements, if the speed of the UAV is not known, the UAV (or communications device) is configured to transmit an indication of an estimate of the location of the communications device at least at one point during the pre-planned journey and the wireless communications network is configured to generate the estimated speed based on the time at which the communications device started the pre-planned journey from the start location, a time of the estimated location of the communications device and the estimated location of the communications device.

Furthermore, in some arrangements, the network can disable the periodic RAN Notification Area Update timer for such UAVs, and so the UAV will only send an RNA update message to the base station and/or core network once it moves into a cell which is not included in the cell list of the RNA or of the flight path. In other words, the infrastructure equipment is configured to disable a periodic notification area update timer for the communications device, the periodic notification area update timer being for use by the communications device to change between the plurality of infrastructure equipment as a serving infrastructure equipment depending on the position of the communications device in the notification area.

As will be appreciated there are various network architectural arrangements which can be used to both identify the RNA area for the communications device and to configure both the radio network infrastructure equipment such as the TRPs of base stations, which form the cells of the network and the communications device which forms the UAV. In one example the mobility function device can both configure the radio network infrastructure equipment and the communications device with the RNA area according to the pre-planned journey. In other examples the last base station or TRP is used in combination with the communications device to specify the RNA area.

In some examples, the RNA area is wider than the flight path, or the RNA is not configured and only the flight path is configured. A list of TRPs or base stations can then be derived based on a geographic knowledge of their location with respect to the flight path. Alternatively, the flight path may not be configured but the RNA is configured. In each of these cases, the UE must inform the network when it deviates from its configured path. The wireless communications network is therefore arranged to transmit information from which an indication of one or more of the infrastructure equipment representing a notification area of the radio access network can be derived. The information can be either a flight path or a list of infrastructure equipment for example. Accordingly, from this information of the flight path or the configured RNA, the network is provided with an indication of the location of the UAV with sufficient accuracy. Accordingly, if a UAV deviates from its predetermined path or encounters a cell which is not configured as part of either its flight path or RNA cell list, then the UE can inform the network. The wireless communications network may issue various commands (tether signals) like for example grounding the UAV, correcting the flight path or changing RNA cell list or raise an alarm with the concerned authorities for violation of air-space.

Initial versions of UAVs may always be kept in RRC_connected mode where tracking of UAV is always done. UAVs can, for example, only be configured in RRC_INACTIVE state if the same requirements are provided in respect of the tracking of the UAV in the RRC_INACTIVE state as they are for the RRC Connected state.

In accordance with example embodiments, the network will configure the RNA as the cell list to cover the whole flight path plan. The cell list can be sent to UAV via dedicated signalling or broadcast in the system information in the format of a RAN area ID. In other words, the infrastructure equipment is configured to determine that the communications device has transitioned into an inactive state, to configure, as a cell list, the one or more infrastructure equipment of the notification area (RNA area) to be infrastructure equipment which form the route of the pre-planned journey from the start location to the destination location, and to transmit the cell list to the communications device.

Once the UAV transitions to the RRC_INACTIVE state, the last (i.e. most recent) serving base station will record the corresponding timestamp. If there is downlink data to be sent to the UAV, then according to the time duration since the UAV transitioned to the inactive state together with the UAV's known speed, the last serving base station can estimate in which cell the UAV may be currently located. Then instead of paging all the cells in the RNA, a paging message to that estimated serving cell can be sent directly, thus saving unnecessary power and time at both the last serving base station and the other base stations in the RNA. This is shown in the example of FIG. 4, in which RAN based paging is carried out over the Xn interface (which connects 5G/NR gNodeBs to one another).

Figure 4:
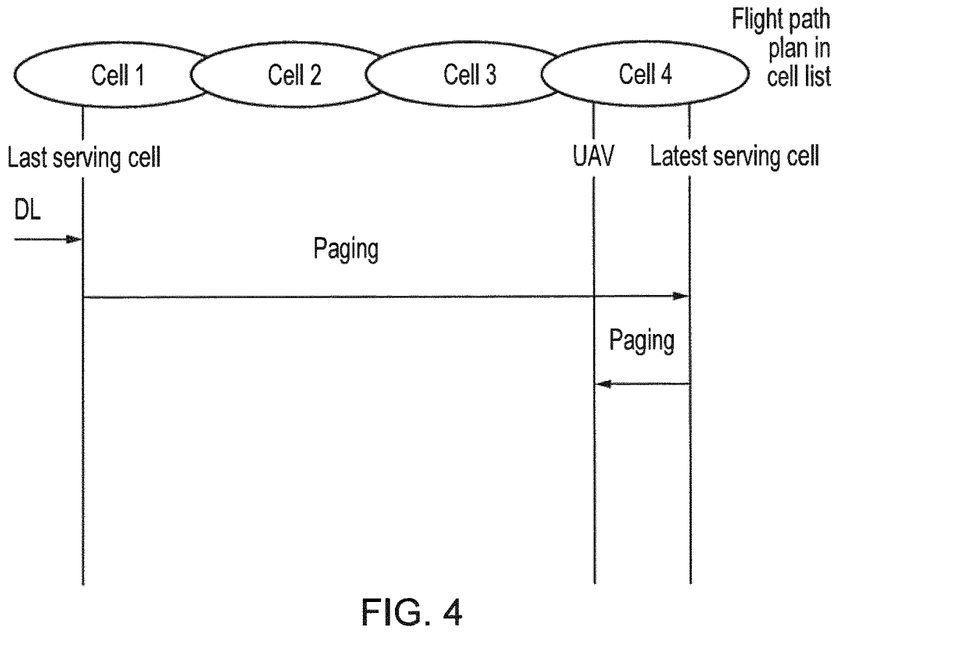
FIG. 4 shows an example of RAN based paging over the Xn interface in accordance with embodiments of the present technique.

As shown in FIG. 4, the RNA according to the pre-planned flight path of the UAV includes four cells cell1, cell2, cell3, cell4. The last serving cell at which the UAV transitioned to the RRC_INACTIVE state is shown as the first left hand cell cell1. At this time a base station which is serving the cell1 recorded a time stamp of time at which the UAV was camped onto this cell cell1. Based on an estimated speed of the UAV, the last serving base station cell1 can estimate a location of the UAV along the flight path and therefore the latest serving cell cell4 from which a paging message should be sent. In other words, the wireless communications network is configured to transmit a paging message to the UAV (communications device) via one of the infrastructure equipment in the notification area (RNA area) based on an estimated speed of the communications device and a time at which the communications device started the pre-planned journey from the start location.

In an arrangement according to an example embodiment, if the serving base station cannot be sure which base station is the exact latest serving base station, for example if the UAV is in the boundary between two base stations (able to receive signals from two base stations), or its speed is known to be slightly inaccurate, then those two (or more) base stations will be paged accordingly. It will be appreciated that still saves power compared to paging all base stations in the RNA. In other words, the wireless communications network is configured to determine, based on an estimated speed of the communications device and a time at which the communications device started the pre-planned journey from the start location, two or more of the infrastructure equipment of the notification area (RNA area) in which the communications device may be, and to transmit a paging message to the communications device via each of the two or more of the infrastructure equipment in the notification area.

Figure 5:
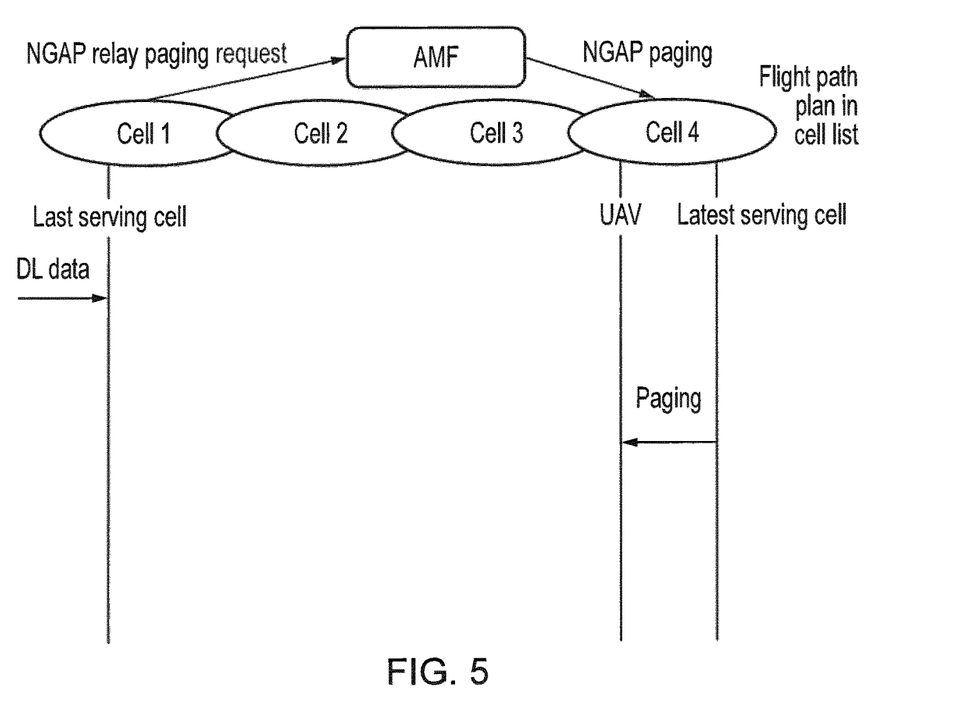
FIG. 5 shows an example of RAN based paging using a 5GC relay in accordance with embodiments of the present technique.

If there is no Xn interface between the last serving node cell1 and latest serving node cell4, the RAN based paging message relayed by 5G core network (5GC) is also considered as another arrangement. An example of this arrangement is shown in FIG. 5, which corresponds to FIG. 4, but adapted according to this example. In this case, as illustrated in FIG. 5, the latest serving node ID will be included in the NG Application Protocol (NGAP) relay paging request to indicate to the Access & Mobility Management Function (AMF) the target recipient of the paging message. In other words, the wireless communications network is configured to transmit a paging message to a relaying entity for forwarding to the communications device via one of the infrastructure equipment in the notification area based on an estimated speed of the communications device and a time at which the communications device started the pre-planned journey from the start location.

In each of the above arrangements, whether the paging uses the 5GC or the Xn interface, and whether one base station or multiple base stations are paged, after receiving the paging message for the UAV, the latest serving base station will then page the UAV according to conventional procedure.

For the UAVs with a known flight path plan, upon transitioning to the RRC_INACTIVE state, the periodic timer can be disabled or set to a very large value (i.e. infinity, or as large as possible) as there is no need for the UAV to itself periodically-update the latest serving base station information. The timer could also be set to zero which means that it starts and stops in the same subframe, which means that no timer is set. With this special setting, the corresponding update signalling can be saved significantly.

The UAV only needs to transmit update signalling if the new serving cell is not in the RNA cell list, as this may indicate that the UAV has for some reason (e.g. for safety purposes or due to a malfunction/accident) deviated from the original planned flight route. Although conventional UEs in the inactive state will also initiate the update procedure once they reselect a cell not belonging to RNA, in this known flight path scenario, this trigger for the RNA update request may have a different, special meaning. Furthermore, in a traditional RNA update procedure, the UE may only send update messages to its latest serving eNodeB. However, in this case, one more message can be added to send the update message to the core network via the latest serving eNodeB, including the flight path information, where the message asks the core network to co-ordinate all the cells covering the flight path for a further check. In other words, the communications device is configured to transmit a notification area update message to one of the infrastructure equipment of the wireless access network if the communications device selects a cell for receiving down link communications which is not one of the one or more infrastructure equipment in the notification area, and otherwise not to transit the notification area update message during the pre-planned journey.

When the UAV is landing, it may still remain in the RRC_INACTIVE state, for example, to receive a signature and transmit this back to the network. In such a case another, new, RNA could be updated accordingly to fit the case for, for example, a ground communication cell list or a new flight path plan.

Embodiments of the present technique provide enhancements for UAVs in the RRC_INACTIVE state with known flight paths, for which speed estimation is possible. These enhancements provide advantages including that paging signalling can be saved compared to paging all cells in an RNA, thus saving on both time and power overheads each time a paging message is required to be transmitted. A further advantage provided by these enhancements is that the RNA update signalling can be saved, as it is no longer necessary; the network should be able to determine where the UE/UAV is at any given time through its knowledge of speed, time and the flight path.

Those skilled in the art would appreciate that, although embodiments of the present technique herein described generally refer to a "flight path plan", they may be equally applicable to ground based UEs which follow a known path along the ground rather than through the air.

Those skilled in the art would also appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

According to an example embodiment of the present technique, there is provided a communications device for transmitting data to or receiving data from a wireless communications network, the communications device comprising transmitter circuitry for transmitting signals representing data via a wireless access interface provided by the infrastructure equipment, receiver circuitry for receiving signals representing data transmitted from the infrastructure equipment via the wireless access interface, a position detection receiver for generating an indication of a location of the communications device, and controller circuitry for controlling the transmitter circuitry and the receiver circuitry to transmit the data to the wireless communications network and to receive the data from the wireless communications network, the controller circuitry being configured to receive, from one of the infrastructure equipment, an indication of one or more of the infrastructure equipment representing a notification area of the radio access network, the one or more infrastructure equipment of the notification area being used to transmit a paging message to the communications device for the communications device to receive downlink data from the wireless communications network, wherein the one or more infrastructure equipment of the notification area are identified by the wireless communications network from a pre-planned journey to be made by the communications device from a start location to a destination location.

The following numbered paragraphs provide further example aspects and features of the present technique:

Paragraph 1. A wireless communications system comprising
a plurality of infrastructure equipment forming part of a radio access network of a wireless communications network, each of the plurality of infrastructure equipment including transmitter circuitry for transmitting signals to communications devices via a wireless access interface formed by the infrastructure equipment, and receiver circuitry for receiving signals from the communications devices via the wireless access interface, and a communications device configured to transmit signals via the wireless access interface to one or more of the infrastructure equipment and to receive signals transmitted from one or more of the infrastructure equipment via the wireless access interface, and the communications device is configured, when in an inactive state, to receive, from one of the infrastructure equipment, information from which an indication of one or more of the infrastructure equipment representing a notification area of the radio access network can be derived, the one or more infrastructure equipment of the notification area being for use in transmitting tether signals to the communications device from the wireless communications network, wherein the one or more infrastructure equipment of the notification area are identified by the wireless communications network from a pre-planned journey to be made by the communications device for transmitting the tether signals to the communications device during the journey.

Paragraph 2. A wireless communications system according to paragraph 1, wherein the wireless communications network is configured to transmit the tether signals to the communications device via one of the infrastructure equipment in the notification area based on an estimated speed of the communications device and a time at which the communications device entered into an inactive state to receive the information from the one or more infrastructure equipment of the notification area can be derived.

Paragraph 3. A wireless communications system according to paragraph 2, wherein the communications device is configured to transmit an indication of an estimate of the location of the communications device at least at one point during the pre-planned journey and the wireless communications network is configured to generate the estimated speed based on the time at which the communications device started the pre-planned journey from the start location, a time of the estimated location of the communications device and the estimated location of the communications device.

Paragraph 4. A wireless communications system according to paragraphs 1, 2 or 3, wherein the communications device is configured to transmit a notification area update message to one of the infrastructure equipment of the wireless access network if the communications device selects a cell for receiving down link communications which is not one of the one or more infrastructure equipment in the notification area or any other information formed from the information received by the communications device in the inactive state, and otherwise not to transmit the notification area update message during the pre-planned journey.

Paragraph 5. A wireless communications system as claimed in any preceding Claim, comprising a mobility function device arranged in communication with the one or more infrastructure equipment and configured to transmit the information from which the indication of the one of more infrastructure equipment of the notification area to the communications device can be derived.

Paragraph 6. A wireless communications system according to paragraphs 1 to 5, wherein the infrastructure equipment is configured to disable a periodic notification area update timer for the communications device, the periodic notification area update timer being for use by the communications device to change between the plurality of infrastructure equipment as a serving infrastructure equipment depending on the position of the communications device in the notification area.

Paragraph 7. A wireless communications system according to paragraphs 1 to 6, wherein the infrastructure equipment is configured to determine that the communications device has transitioned into an inactive state, to configure, as a cell list, the one or more infrastructure equipment of the notification area to be infrastructure equipment which form the route of the pre-planned journey from the start location to the destination location, and to transmit the cell list to the communications device.

Paragraph 8. A wireless communications system according to paragraph 7, wherein the cell list is directly transmitted by the infrastructure equipment to the communications device.

Paragraph 9. A wireless communications system according to paragraph 7, wherein the infrastructure equipment is configured to broadcast the cell list or the area ID.

Paragraph 10. A wireless communications system as claimed in any preceding Claim, wherein the wireless communications network is configured to determine, based on an estimated speed of the communications device and a time at which the communications device entered into an inactive state, two or more of the infrastructure equipment of the notification area in which the communications device may be, and to transmit the tether signals to the communications device via each of the two or more of the infrastructure equipment in the notification area.

Paragraph 11. A wireless communications system as claimed in any preceding Claim, wherein the wireless communications network is configured to transmit the tether signals to a relaying entity for forwarding to the communications device via one of the infrastructure equipment in the notification area based on an estimated speed of the communications device and a time at which the communications device started the pre-planned journey from the start location.

Paragraph 12. An infrastructure equipment forming part of a wireless communications network, the infrastructure equipment comprising controller circuitry and transceiver circuitry which are configured in combination:

to transmit information from which an indication of one or more of the infrastructure equipment representing a notification area of the radio access network, the one or more infrastructure equipment of the notification area being for use in transmitting tether signals to the communications device from the wireless communications network, wherein the one or more infrastructure equipment of the notification area are identified by the wireless communications network from a pre-planned journey to be made by the communications device for transmitting the tether signals to the communications device during the journey.

Paragraph 13. An infrastructure equipment according to paragraph 12, wherein the controller circuitry is configured in combination with the transceiver circuitry to transmit the tether signals to the communications device via one of the infrastructure equipment in the notification area based on an estimated speed of the communications device and a time at which the communications device entered into an inactive state to receive the information from the one or more infrastructure equipment of the notification area can be derived.

Paragraph 14. An infrastructure equipment according to paragraph 13, wherein the controller circuitry is configured to generate the estimated speed based on the time at which the communications device entered the inactive state, a time of the estimated location of the communications device and the estimated location of the communications device.

Paragraph 15. An infrastructure equipment according to paragraph 12, wherein the controller circuitry is configured in combination with the transceiver circuitry to transmit signals to disable a periodic notification area update timer for the communications device, the periodic notification area update timer being for use by the communications device to change between the plurality of infrastructure equipment as a serving infrastructure equipment depending on the position of the communications device in the notification area.

Paragraph 16. An infrastructure equipment according to any of paragraphs 12 to 15, wherein the controller circuitry is configured in combination with the transceiver circuitry
 to determine that the communications device has transitioned into an inactive state,
 to configure, as a cell list, the one or more infrastructure equipment of the notification area to be infrastructure equipment which form the route of the pre-planned journey from the start location to the destination location, and
 to transmit the cell list to the communications device.

Paragraph 17. An infrastructure equipment according to paragraph 16, wherein the cell list is directly transmitted to the communications device.

Paragraph 18. An infrastructure equipment according to paragraph 16, wherein the controller circuitry is configured in combination with the transceiver circuitry to broadcast the cell list or the area ID.

Paragraph 19. An infrastructure equipment according to any of paragraphs 12 to 15, wherein the controller circuitry is configured in combination with the transceiver circuitry to transmit the tether signals to a relaying entity for forwarding to the communications device via one of the infrastructure equipment in the notification area based on an estimated speed of the communications device and a time at which the communications device started the pre-planned journey from the start location.

Paragraph 20. An infrastructure equipment according to any of paragraphs 12 to 19, wherein the tether signals include one of a paging message, a downlink data transmission, a command to control movement or a signalling message.

Paragraph 21. A communications device for transmitting data to or receiving data from a wireless communications network, the communications device comprising
 transmitter circuitry for transmitting signals representing data via a wireless access interface provided by the infrastructure equipment,
 receiver circuitry for receiving signals representing data transmitted from the infrastructure equipment via the wireless access interface, and
 controller circuitry for controlling the transmitter circuitry and the receiver circuitry to transmit the data to the wireless communications network and to receive the data from the wireless communications network, the controller circuitry being configured
 to receive, from one of the infrastructure equipment, information from which an indication of one or more of the infrastructure equipment representing a notification area of the radio access network can be derived, the one or more infrastructure equipment of the notification area being for use in transmitting tether signals to the communications device from the wireless communications network, wherein the one or more infrastructure equipment of the notification area are identified by the wireless communications network from a pre-planned journey to be made by the communications device for transmitting the tether signals to the communications device during the journey.

Paragraph 22. A communications device according to paragraph 21, wherein the controller circuitry is configured with the receiver circuitry to receive the tether signals via one of the infrastructure equipment in the notification area based on an estimated speed of the communications device and a time at which the communications device entered into an inactive state to receive the information from the one or more infrastructure equipment of the notification area can be derived.

Paragraph 23. A communications device according to paragraph 21, wherein the controller circuitry is configured with the transmitter circuitry to transmit an indication of an estimate of the location of the communications device at least at one point during the pre-planned journey for the wireless communications network to generate the estimated speed based on the time at which the communications device started the pre-planned journey from the start location, a time of the estimated location of the communications device and the estimated location of the communications device.

Paragraph 24. A communications device according to paragraph 21, 22 or 23, wherein the controller circuitry is configured with the transmitter circuitry to transmit a notification area update message to one of the infrastructure equipment of the wireless access network if the communications device selects a cell for receiving down link communications which is not one of the one or more infrastructure equipment in the notification area or any other information formed from the information received by the communications device in the inactive state, and otherwise not to transmit the notification area update message during the pre-planned journey.

Paragraph 25. A communications device according to paragraphs 21 to 24, wherein the controller circuitry is configured with the receiver circuitry to receive a command to disable a periodic notification area update timer for the communications device, the periodic notification area update timer being for use by the communications device to change between the plurality of infrastructure equipment as a serving infrastructure equipment depending on the position of the communications device in the notification area.

Paragraph 26. An infrastructure equipment according to any of paragraphs 21 to 25, wherein the tether signals include one of a paging message, a downlink data transmission, a command to control movement or a signalling message.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] TS 23.501 Release-15, http://www.3gpp.org/ftp/Specs/archive/23_series/23.501/
[3] R2-1705000, "Identification of Air-borne Drones," Huawei, HiSilicon, 3GPP TSG-RAN WG2 Meeting #98, Hangzhou, China, May 15-19, 2017.
[4] 3GPP TS 38.300 version 15.0.0 Release 15.

What is claimed is:

1. An infrastructure equipment forming part of a wireless communications network, the infrastructure equipment comprising controller circuitry and transceiver circuitry which are configured in combination:
to transmit information from which an indication of one or more of the infrastructure equipment representing a notification area of the radio access network, the one or more infrastructure equipment of the notification area being for use in transmitting tether signals to the communications device from the wireless communications network,
wherein the one or more infrastructure equipment of the notification area are identified by the wireless communications network from a pre-planned journey to be made by the communications device for transmitting the tether signals to the communications device during the journey.

2. The infrastructure equipment as claimed in claim 1, wherein the controller circuitry is configured in combination with the transceiver circuitry to transmit the tether signals to the communications device via one of the infrastructure equipment in the notification area based on an estimated speed of the communications device and a time at which the communications device entered into an inactive state to receive the information from the one or more infrastructure equipment of the notification area can be derived.

3. The infrastructure equipment as claimed in claim 2, wherein the controller circuitry is configured to generate the estimated speed based on the time at which the communications device entered the inactive state, a time of the estimated location of the communications device and the estimated location of the communications device.

4. The infrastructure equipment as claimed in claim 1, wherein the controller circuitry is configured in combination with the transceiver circuitry to transmit signals to disable a periodic notification area update timer for the communications device, the periodic notification area update timer being for use by the communications device to change between the plurality of infrastructure equipment as a serving infrastructure equipment depending on the position of the communications device in the notification area.

5. The infrastructure equipment as claimed in claim 1, wherein the controller circuitry is configured in combination with the transceiver circuitry
to determine that the communications device has transitioned into an inactive state,
to configure, as a cell list, the one or more infrastructure equipment of the notification area to be infrastructure equipment which form the route of the pre-planned journey from the start location to the destination location, and
to transmit the cell list to the communications device.

6. The infrastructure equipment as claimed in claim 5, wherein the cell list is directly transmitted to the communications device.

7. The infrastructure equipment as claimed in claim 5, wherein the controller circuitry is configured in combination with the transceiver circuitry to broadcast the cell list or the area identifier (ID).

8. The infrastructure equipment as claimed in claim 1, wherein the controller circuitry is configured in combination with the transceiver circuitry to transmit the tether signals to a relaying entity for forwarding to the communications device via one of the infrastructure equipment in the notification area based on an estimated speed of the communications device and a time at which the communications device started the pre-planned journey from the start location.

9. The infrastructure equipment as claimed in claim 1, wherein the tether signals include one of a paging message, a downlink data transmission, a command to control movement or a signalling message.

10. A communications device for transmitting data to or receiving data from a wireless communications network, the communications device comprising
transmitter circuitry for transmitting signals representing data via a wireless access interface provided by the infrastructure equipment,
receiver circuitry for receiving signals representing data transmitted from the infrastructure equipment via the wireless access interface, and
controller circuitry for controlling the transmitter circuitry and the receiver circuitry to transmit the data to the wireless communications network and to receive the data from the wireless communications network, the controller circuitry being configured
to receive, from one of the infrastructure equipment, information from which an indication of one or more of the infrastructure equipment representing a notification area of the radio access network can be derived, the one or more infrastructure equipment of the notification area being for use in transmitting tether signals to the communications device from the wireless communications network, wherein the one or more infrastructure equipment of the notification area are identified by the wireless communications network from a pre-planned journey to be made by the communications device for transmitting the tether signals to the communications device during the journey.

11. The communications device as claimed in claim 10, wherein the controller circuitry is configured with the receiver circuitry to receive the tether signals via one of the infrastructure equipment in the notification area based on an estimated speed of the communications device and a time at which the communications device entered into an inactive state to receive the information from the one or more infrastructure equipment of the notification area can be derived.

12. The communications device as claimed in claim 10, wherein the controller circuitry is configured with the transmitter circuitry to transmit an indication of an estimate of the location of the communications device at least at one point during the pre-planned journey for the wireless communications network to generate the estimated speed based on the time at which the communications device started the pre-planned journey from the start location, a time of the estimated location of the communications device and the estimated location of the communications device.

13. The communications device as claimed in claim 10, wherein the controller circuitry is configured with the transmitter circuitry to
transmit a notification area update message to one of the infrastructure equipment of the wireless access network if the communications device selects a cell for receiving down link communications which is not one of the one or more infrastructure equipment in the notification area or any other information formed from the information received by the communications device in the inactive state, and
otherwise prohibit transmission of the notification area update message during the pre-planned journey.

14. The communications device as claimed in claim 10, wherein the controller circuitry is configured with the receiver circuitry to receive a command to disable a periodic notification area update timer for the communications device, the periodic notification area update timer being for use by the communications device to change between the plurality of infrastructure equipment as a serving infrastructure equipment depending on the position of the communications device in the notification area.

15. The communications device as claimed in claim 10, wherein the tether signals include one of a paging message, a downlink data transmission, a command to control movement or a signalling message.

16. Circuitry for a wireless communications system comprising
a plurality of infrastructure equipment forming part of a radio access network of a wireless communications network, each of the plurality of infrastructure equipment including transmitter circuitry for transmitting signals to communications devices via a wireless access interface formed by the infrastructure equipment, and receiver circuitry for receiving signals from the communications devices via the wireless access interface, and
a communications device configured to transmit signals via the wireless access interface to one or more of the infrastructure equipment and to receive signals transmitted from one or more of the infrastructure equipment via the wireless access interface, and the communications device is configured, when in an inactive state,
to receive, from one of the infrastructure equipment, information from which an indication of one or more of the infrastructure equipment representing a notification area of the radio access network can be derived, the one or more infrastructure equipment of the notification area being for use in transmitting tether signals to the communications device from the wireless communications network,
wherein the one or more infrastructure equipment of the notification area are identified by the wireless communications network from a pre-planned journey to be made by the communications device for transmitting the tether signals to the communications device during the journey.

* * * * *